United States Patent
Stucchi et al.

(10) Patent No.: US 9,068,544 B2
(45) Date of Patent: Jun. 30, 2015

(54) FUEL-INJECTION SYSTEM FOR AN INTERNAL-COMBUSTION ENGINE

(75) Inventors: Sergio Stucchi, Valenzano (IT); Raffaele Ricco, Valenzano (IT); Onofrio De Michele, Valenzano (IT); Marcello Gargano, Valenzano (IT)

(73) Assignee: C.R.F. Società Consortile per Azioni, Orbassano (IT)

( * ) Notice: Subject to any disclaimer, the term of this patent is extended or adjusted under 35 U.S.C. 154(b) by 401 days.

(21) Appl. No.: 13/805,629

(22) PCT Filed: Jul. 7, 2011

(86) PCT No.: PCT/EP2011/061558
§ 371 (c)(1),
(2), (4) Date: Mar. 11, 2013

(87) PCT Pub. No.: WO2012/004368
PCT Pub. Date: Jan. 12, 2012

(65) Prior Publication Data
US 2013/0167808 A1 Jul. 4, 2013

(30) Foreign Application Priority Data
Jul. 7, 2010 (EP) .................................... 10168795

(51) Int. Cl.
*F02D 41/20* (2006.01)
*F02M 69/04* (2006.01)
(Continued)

(52) U.S. Cl.
CPC ................ *F02M 69/04* (2013.01); *F02D 41/20* (2013.01); *F02D 41/2096* (2013.01);
(Continued)

(58) Field of Classification Search
CPC . F02D 41/0025; F02D 41/20; F02D 41/2096; F02D 41/30; F02D 41/402; F02M 47/027; F02M 51/061; F02M 51/0625; Y02T 10/44

USPC .......... 123/296, 299, 478–480, 490; 239/585.1, 585.4, 585.5, 533.2, 533.3, 239/533.8; 701/103, 104
See application file for complete search history.

(56) References Cited

U.S. PATENT DOCUMENTS 5,655,501 A * 8/1997 Hafner ........................... 123/496
5,803,049 A   9/1998 Harcombe
(Continued)

FOREIGN PATENT DOCUMENTS

DE    19636088 A1   3/1998
DE    10326914 A1   1/2005
(Continued)

OTHER PUBLICATIONS

Chmela, Franz G. et al., "Emissionsverbesserung an Diesel-motoren mit Direkteinspritzung mittels Einspritzverlaufsformung," MTZ Motortechnische Zeitschrift, Vieweg Verlag, Weisbaden, DE, vol. 60, No. 9, Sep. 1, 1999, pp. 552-558.

*Primary Examiner* — John Kwon
*Assistant Examiner* — Johnny H Hoang
(74) *Attorney, Agent, or Firm* — Seed IP Law Group PLLC (57) ABSTRACT

A fuel-injection system for an internal-combustion engine has at least one fuel injector with a fuel-metering servo valve provided with an open/close element, which is movable in response to the action of an electric actuator; and an electronic control unit which issues to the electric actuator two electrical commands, one for carrying out a pilot injection and one for carrying out a main injection; the two electrical commands being separated by an electrical dwell time such that the main injection starts, without solution of continuity with the pilot injection, when an open/close needle for carrying out fuel injections into a cylinder of the internal-combustion engine remains at a lift value in which the fuel flow rate is negligible; in particular, the second electrical command is issued during a rebound of the open/close element on the valve seat.

16 Claims, 7 Drawing Sheets

(51) Int. Cl.
*F02D 41/40* (2006.01)
*F02M 45/08* (2006.01)
*F02M 47/02* (2006.01)
*F02M 63/00* (2006.01)
*F02D 41/38* (2006.01)

(52) U.S. Cl.
CPC ....... *F02D 41/402* (2013.01); *F02D 2041/389* (2013.01); *F02M 45/08* (2013.01); *F02M 47/027* (2013.01); *F02M 63/0015* (2013.01); *F02M 63/0078* (2013.01); *Y02T 10/44* (2013.01)

(56) References Cited

U.S. PATENT DOCUMENTS

| | | | | |
|---|---|---|---|---|
| 6,079,641 | A * | 6/2000 | Shinogle et al. | 239/533.4 |
| 6,520,150 | B1 * | 2/2003 | West | 123/446 |
| 2003/0146295 | A1 * | 8/2003 | Lei | 239/88 |
| 2004/0163626 | A1 * | 8/2004 | Stockner et al. | 123/446 |
| 2006/0090733 | A1 * | 5/2006 | Fujii | 123/446 |
| 2007/0056563 | A1 * | 3/2007 | Kanne et al. | 123/478 |
| 2009/0048757 | A1 * | 2/2009 | Chang et al. | 701/102 |
| 2009/0090333 | A1 * | 4/2009 | Spadafora et al. | 123/494 |
| 2009/0150044 | A1 | 6/2009 | Topinka et al. | |

FOREIGN PATENT DOCUMENTS

| | | |
|---|---|---|
| EP | 1 035 314 A2 | 9/2000 |
| EP | 1 106 816 A2 | 6/2001 |
| EP | 1612 398 A1 | 1/2006 |
| EP | 1 621 764 A1 | 2/2006 |
| EP | 1 657 422 A1 | 5/2006 |
| EP | 1 795 738 A1 | 6/2007 |
| EP | 2 138 705 A1 | 12/2009 |
| FR | 2761113 A1 | 9/1998 |
| WO | 2008/138800 A1 | 11/2008 |
| WO | 2009/092484 A1 | 7/2009 |
| WO | 2009/092507 A1 | 7/2009 |

* cited by examiner

FUEL-INJECTION SYSTEM FOR AN INTERNAL-COMBUSTION ENGINE

BACKGROUND

1. Technical Field

The present disclosure relates to a fuel-injection system for an internal-combustion engine, in particular of the common-rail type.

2. Description of the Related Art

As is known, in common-rail fuel-injection systems, the electroinjectors are governed electronically by an electronic control unit appropriately programmed for issuing electrical commands to the electroinjectors. Said electrical commands provide strategies of fuel-injection specifically devised for reaching given targets in terms of fuel consumption and/or emissions of pollutant substances and/or performance.

For example, in the patent No. EP1035314 B1, filed in the name of the present applicant, a common-rail fuel-injection system is described, in which the electronic control unit is programmed to ensure that the fuel-injection system carries out, in one and the same cylinder of the engine and in one and the same engine cycle, an injection event comprising multiple, temporally consecutive, fuel injections, which comprise:

- a main fuel injection, if need be divided into two main sub-injections, around the top dead center of end of compression;
- two fuel injections preceding the main injection, one at a sufficient distance from the main injection to give rise to a combustion distinct from that of the main injection, and the other defining a pilot injection sufficiently close to the main injection to give rise to a combustion continuous with that of the main injection; and
- two fuel injections subsequent to the main injection, one at a sufficient distance from the main injection to give rise to a combustion distinct from that of the main injection and, if need be, divided into two or more sub-injections of fuel, and the other sufficiently close to the main injection to give rise to a combustion continuous with that of the main injection.

The patent No. FR2761113 B1 describes a common-rail fuel-injection system in which the electronic control unit is programmed for carrying out, in one and the same cylinder of the engine and in one and the same engine cycle, a main fuel injection and a pilot fuel injection. In a first operating mode, the pilot injection is carried out sufficiently far from the main injection as to be separated from the latter by a dwell time, in which the fuel is not injected. In a second operating mode, the main injection is so close to the pilot injection as to overlap the latter. The first operating mode is implemented for medium-to-low r.p.m. and/or engine loads, and the second operating mode for high r.p.m. and/or engine loads.

In the patent applications Nos. EP1657422 A1 and EP1795738 A1 filed in the name of the present applicant, in each injector, the fuel flow rate injected is regulated by a needle, governed via a servo valve, where an electric actuator actuates an open/close element of the so-called "balanced" type (i.e., the forces due to the fuel pressures and acting on the open/close element in an axial direction are substantially zero when the servo valve is closed). The electronic control unit is programmed for implementing a particular fuel-injection mode, generally referred to as "fuel-injection-rate shaping", by issuing to the electric actuator a first electrical command of predetermined duration for carrying out a pilot fuel injection, and a subsequent second electrical command of a duration depending upon the engine operating conditions for carrying out a main fuel injection. The end of the first electrical command and the start of the second electrical command are separated by an electrical dwell time that is sufficiently short as to set off the main injection without solution of continuity with the pilot injection.

In particular, the curve that represents the instantaneous fuel flow rate as a function of time can have a so-called "two-hump profile", i.e., the main injection can start at an instant in which the needle of the nebulizer is descending to reduce the instantaneous fuel flow rate injected during the pilot injection. In the context of a two-hump profile, the two just mentioned documents propose different possibilities of fuel-injection-rate shaping.

In one of said shapings, as in the document No. FR2761113 B1, the main and pilot injections partially overlap.

In this case, considering the example of a pilot injection that injects a fuel amount of the order of 1-3 $mm^3$, given the same supply fuel pressure in the common rail, and fixing the profile, duration, and electrical dwell time of the electrical injection commands, the fuel amount injected as a whole during the pilot and main injections is not an amount that can be repeated with sufficient precision between different injection events, both for injection events in the same injector and for injection events of a certain lot of injectors having the same structural characteristics and the same dimensions.

In fact, during the terminal part of the pilot injection and the first part of the main injection, the curve that represents the instantaneous fuel flow rate as a function of time depends upon the combination of two factors: the instantaneous fuel pressure in the nebulizer; and the effective position of the needle that is descending at the instant in which the main injection starts. The effective position of the needle, in turn, experimentally is not always identical, i.e., it varies slightly between the different injection events, as a function of the dynamics with which the pressure varies in the metering chamber of the servo valve and in the proximity of the injection nozzles of the nebulizer at the instant in which the main injection starts.

In other words, the uncertainty of the motion law for closing the needle during the pilot injection does not enable a repeatable synchronization of the second electrical command with the optimal position of the needle in order to impart, at each injection event, the same desired injection profile. Frequently, on account of said difficulty of synchronization, the second electrical command is given in advance with respect to what would be desirable, so that the needle reverses the direction of the motion and starts the main injection when it is not yet reducing the fuel flow rate of the pilot injection. In these cases, the fuel amount injected is in excess with respect to what would be desirable, and it is not practically possible to distinguish the main injection from the pilot injection. Consequently, operation of the engine is different from what is set down in the design specifications and causes a worsening of the pollutant emissions. The situation tends to worsen with wear and ageing of the injector since the control of synchronization of the second electrical command does not manage to take into account how the motion law of the needle evolves during the life of the injector.

In another fuel-injection-rate shaping, once again in the context of a two-hump profile, the electrical dwell time between the two injection commands is such as to set off the main injection when the needle has reached a closing position in which it blocks the flow of fuel towards the injection nozzles and the instantaneous flow rate of the fuel during the pilot injection has just reached the zero value, but the time of stopping of the needle in said closing position is infinitesimal.

Also in this case, there is no solution of continuity between the pilot and main injections in so far as the hydraulic dwell time between the end of the pilot injection and the start of the main injection is zero. As compared to the case where there is overlapping between the pilot and main injections, the fuel amount injected as a whole during the pilot and main injections repeats in a more reproducible way between different successive injection events in one and the same injector.

In fact, the curve that represents the instantaneous fuel flow rate as a function of time defines exactly the instant in which the pilot injection terminates and simultaneously the main injection starts, and in said instant the initial conditions of the main injection are always the same, i.e., the position of the needle of the nebulizer is such as to block the flow of fuel towards the injection nozzles.

Furthermore, the fuel amount injected as a whole during the pilot and main injections can be determined with excellent precision, for example by computing the integral of the curve of instantaneous flow rate as a function of time in so far as in said curve the profiles of the pilot and main injections are substantially constant between various injection events and, what is more, are distinguishable from one another.

However, this fuel-injection-rate shaping constitutes a condition that is necessary but not sufficient for guaranteeing maximum repeatability of operation of the injector: in fact, if the needle has a closing motion law that is markedly variable with wear or even with the oscillations of the pressure in the supply ducts of the injector, the injector will not have a good repeatability of operation and will preclude correct synchronization of the second electrical command with respect to the first electrical command. For example, with the dimensional variations of the injector on account of wear, the curves that represent the instantaneous fuel flow rate injected as a function of time are subject to variations, for example to a drift along the temporal axis of the abscissae. Leaving the characteristics of the electrical commands that had been set for the pilot injection and the main injection at the start of the life of the injector unvaried, a variation in the curve of the instantaneous flow rate, albeit small, implies immediate recession from the optimal operating point, in which the main injection starts when the needle has just managed to block the flow of fuel injected at the end of the pilot injection.

The new operating point is not foreseeable with precision: the main injection could overlap the pilot injection, or else could be separated temporally from the pilot injection if the needle comes into contact against the corresponding sealing seat of the nebulizer. Consequently, the fuel amount injected is not only different, but above all is unforeseeable with respect to the known one in the optimal operating point defined above.

Consequently, there is felt the need to provide a repeatable fuel-injection system. In other words, the fuel amount as a whole injected in a pilot injection and a main injection would have to be equal, to a good approximation, to the amount that can be determined in the optimal operating point described above, it being substantially constant between various injectors and substantially constant with the passage of time for one and the same injector.

BRIEF SUMMARY

Embodiments of the present invention seek to provide a fuel-injection system for an internal-combustion engine that will enable the need set forth above to be met in a simple way and will hence guarantee a good repeatability when the main fuel injection starts without solution of continuity with the pilot injection.

The above may be achieved, for example, by a fuel-injection system for an internal-combustion engine, as defined in Claim 1.

BRIEF DESCRIPTION OF THE SEVERAL VIEWS OF THE DRAWINGS

For a better understanding of aspects of the present invention, a preferred embodiment is now described purely by way of non-limiting example, with reference to the Figures.

DETAILED DESCRIPTION

Figure 1:
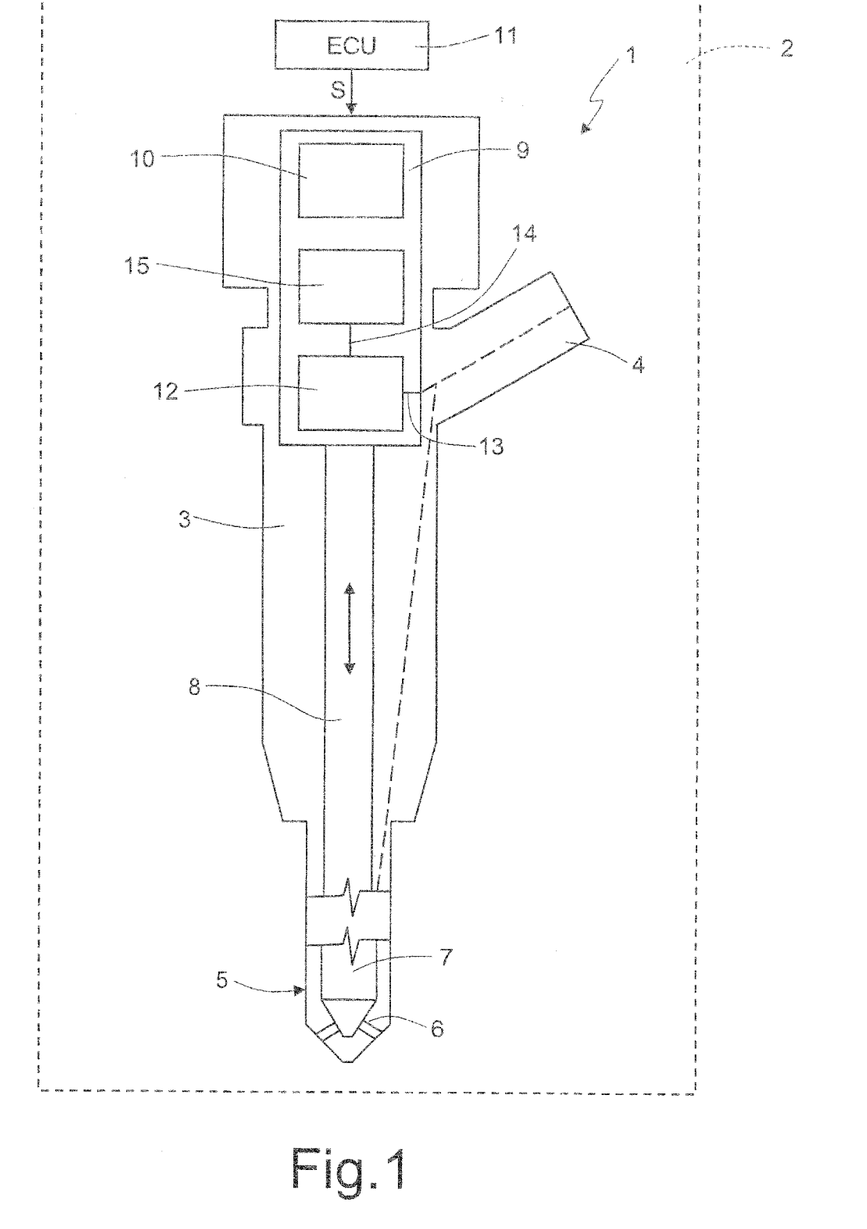
FIG. 1 is a diagram of a fuel injector for a common-rail fuel-injection system.

In FIG. 1, designated as a whole by 1 is a fuel injector for a high-pressure fuel-injection system 2, represented schematically with a dashed line, in particular of the common-rail type, for an internal-combustion engine (not illustrated), in particular a diesel engine.

The injector 1 comprises a hollow injector body 3, which extends along a longitudinal axis and has a lateral inlet 4 for the fuel, designed to be connected, by means of a duct for delivery of the fuel at a high pressure to the common rail, which in turn is connected to a high-pressure pump (not illustrated) of the fuel-injection system 2. The injector body 3 terminates with a nebulizer 5, which has an internal cavity communicating with the inlet of the fuel 4 through a duct, represented with a dashed line, and comprises a tip, designated by the reference number 6, having a roughly conical shape and being provided with one or more injection nozzles 6a. The internal cavity of the nebulizer 5 houses an open/close needle 7, which is axially movable away from and towards a closing position, where it engages a sealing seat in the tip 6 for stopping fuel injection through the injection nozzles 6a.

The nebulizers can be of two different types: in the first type, commonly referred to as "VCO" (valve covered orifice), in order to reduce the fuel flow rate injected, when the open/close needle 7 drops towards the tip 6, it directly obstructs the injection nozzles 6a; in the second type, commonly referred to as "tip nebulizer" or "minisac" or "microsac", the sealing seat in the nebulizer 5 is upstream of a tip 6b from which there depart the injection nozzles 6a, and the displacement of the open/close needle 7 varies an annular area or cross section between the open/close needle 7 and said sealing seat.

Figure 7A:
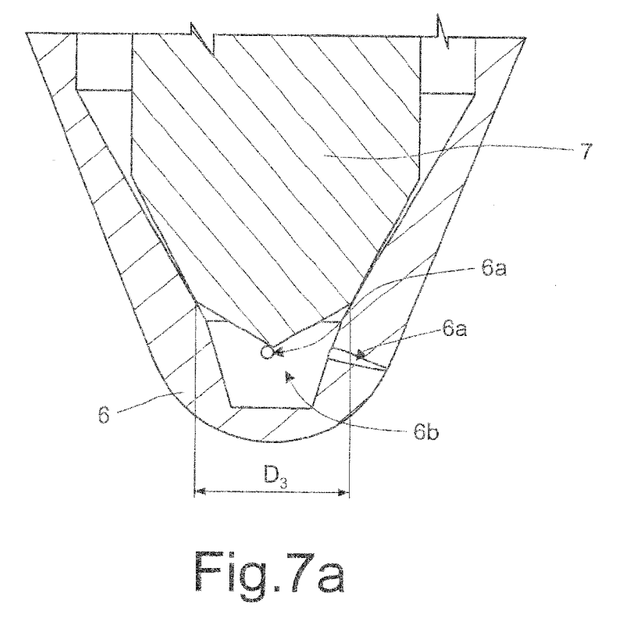
FIGS. 7a and 7b show, at an enlarged scale, a nebulizer of the injector of FIG. 3.
Figure 7B:
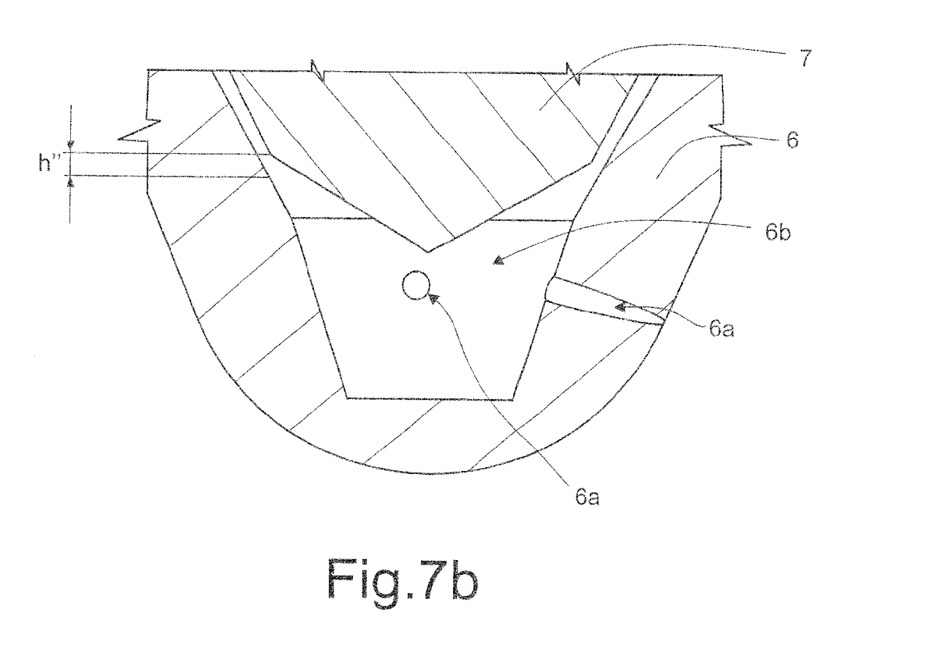

FIG. 7a shows a nebulizer of this latter type, where the open/close needle 7 is set in contact against the corresponding sealing seat. In FIG. 7b, the open/close needle 7 is at a lift value h from the sealing seat: in this position, the section of passage for the fuel is so small as to give rise to a practically zero fuel-injection.

Once again with reference to FIG. 1, the open/close needle 7 is displaced under the action of a control rod 8, which is coaxial with the open/close needle 7 and, in turn, is axially movable under the axial thrust of the pressure of fuel present in a metering chamber 12. In particular, the open/close needle 7 is subjected, during opening, to the axial thrust caused by the fuel present in the cavity of the nebulizer 5 and, during closing, to the axial thrusts caused by the pressure in the metering chamber 12 and by the elastic action of a positioning spring (designated by the reference number 53 in the particular embodiment of FIG. 3).

The control rod 8 and the open/close needle 7 can be fixed to one another, in particular can be made of a single piece, or else can be defined by separate pieces axially coupled to one another.

The top part of the injector body 3 houses a fuel-metering servo valve 9, which is designed to adjust the pressure in the metering chamber 12 and hence to cause movement of the control rod 8 and of the open/close needle 7. The fuel-metering servo valve 9 comprises an electric actuator 10 governed by an electronic control unit 11 programmed for issuing to the electric actuator 10, for each step of fuel-injection and corresponding cycle of combustion in a cylinder of the engine, one or more electrical commands for carrying out corresponding fuel injections. In the present description and in annexed claims, by the term "electrical command" or "injection command" is understood an electric-current signal having a predetermined duration and a predetermined plot or profile as a function of time.

The metering chamber 12 communicates permanently with the inlet 4 for the fuel through an inlet passage 13 and communicates with an outlet (not illustrated) through a discharge passage 14. The inlet passage 13 and the discharge passage 14 have respective calibrated holes, i.e., restrictions having a cross section and length obtained with extreme precision for setting a predetermined difference of pressure between the inlet and the outlet of the restrictions themselves and thus determining the flow rate of incoming fuel and outgoing fuel, respectively.

The fuel-metering servo valve 9 comprises an open/close element 15, which is defined by a single piece or by a number of pieces coupled to one another and is axially movable between a raised end-of-travel position and a lowered end-of-travel position under the action of the electric actuator 10. In the lowered end-of-travel position, the open/close element 15 provides a seal on a corresponding valve seat for closing the discharge passage 14. Lifting of the open/close element 15 from the corresponding valve seat and hence opening of the discharge passage 14 causes an emptying-out of the metering chamber 12 and hence a reduction in the fuel pressure in the metering chamber 12. Said reduction causes the control rod 8 and the open/close needle 7 to perform an axial opening travel, thus determining opening of the injection nozzles 6a and hence injection of fuel into the respective cylinder of the engine. Instead, when the open/close element 15 rests on the corresponding valve seat and closes the discharge passage 14, the fuel that enters the metering chamber 12 through the inlet passage 13 causes the pressure in the metering chamber 12 to rise again so that the control rod 8 and the open/close needle 7 perform an axial closing travel, thus determining closing of the injection nozzles 6a.

The electric actuator 10 can be either of the solenoid type or of the piezoelectric type. In the case of solenoid electric actuator 10, the open/close element 15 is coupled to an armature that may be made of a single piece with the open/close element 15, be a piece that is distinct and fixed with respect to the open/close element 15, or else be a piece coupled with axial play to the open/close element 15. The fuel-metering servo valve 9, as a whole, can be either of the type with so-called "unbalanced" hydraulic architecture, where the open/close element 15 is subjected, when it is set in the lowered end-of-travel position, to the opposite axial actions exerted by the fuel pressure, on one side, and by one or more springs, on the other, or of the type with so-called "balanced" hydraulic architecture, where the open/close element 15 is subjected, when it is set in the lowered end-of-travel position, exclusively to an elastic action that tends to close the valve seat in so far as the axial thrust exerted by the fuel on the open/close element 15 is substantially zero.

An example of fuel-metering servo valve with solenoid electric actuator and unbalanced hydraulic architecture is known, in particular, from the patent No. EP1106816 B1, filed in the name of the present applicant. An example of fuel-metering servo valve with solenoid electric actuator and balanced hydraulic architecture is known, in particular, from the patent application No. EP1795738 A1 and from the patent No. EP1621764 B1, both filed in the name of the present applicant. A fuel-metering servo valve with solenoid electric actuator and balanced hydraulic architecture different from the ones disclosed in the two preceding patents is, for example, known from the two international patent applications Nos. WO2009/092507 A1 and WO2009/092484 A1. Known, instead, from the patent No. EP1612398 B1, filed in the name of the present applicant, and from the international patent application No. WO 2008/138800 A1, is a fuel-metering servo valve with piezoelectric electric actuator and balanced hydraulic architecture.

Figure 2:
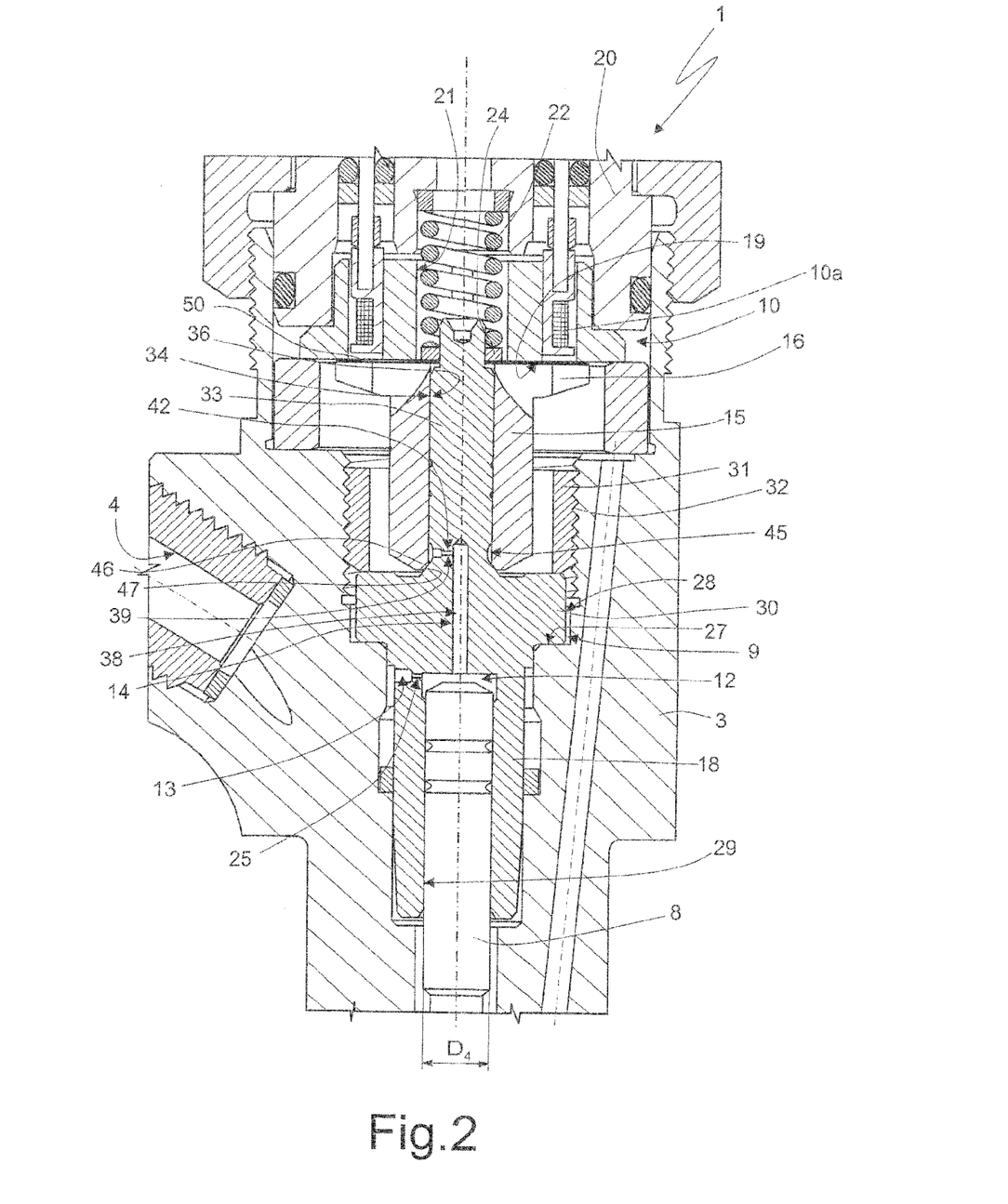
FIGS. 2 and 3 illustrate, in cross-sectional view, some details of a preferred embodiment of a fuel injector for a common-rail fuel-injection system.
Figure 3:
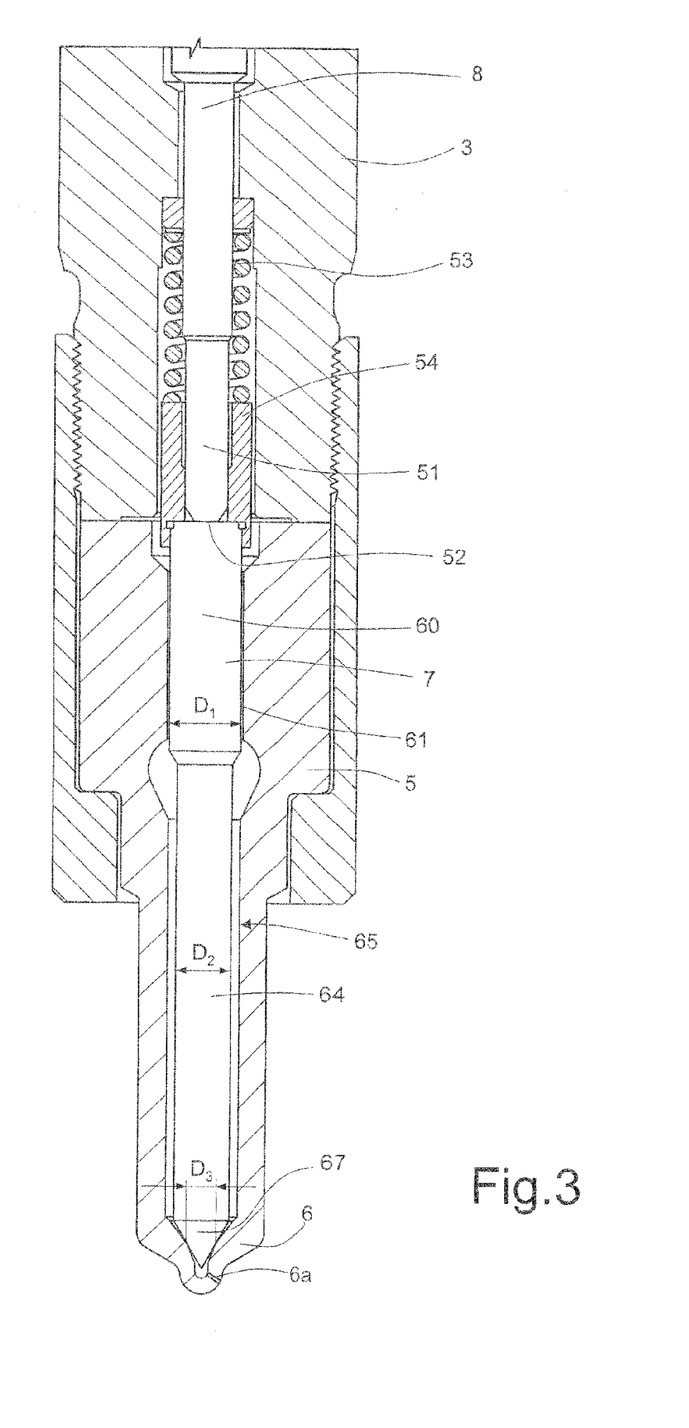

The ensuing treatment will make reference to a balanced hydraulic architecture of the type illustrated in FIGS. 2 and 3, where the open/close element 15 is constituted by a sleeve axially sliding in a fluid-tight way on an axially fixed stem 33, in which at least the outlet of the discharge passage 14 is provided.

The electric actuator 10 comprises an electromagnet 10a designed to govern an armature 16 having the shape of notched disk fixed with respect to the sleeve 15. In particular, the electromagnet 10a is formed by a magnetic core, has a polar contrast surface 19 perpendicular to the longitudinal axis of the injector 1, and is held in position by a support 20. The electric actuator 10 has an axial cavity 21, which houses a helical compression spring 22, pre-loaded so as to exert an action of thrust on the armature 16 and on the sleeve 15, in the direction opposite to the attraction exerted by the electromagnet 10a. In particular, the axial ends of the spring 22 act on the support 20 and, respectively, on the armature 16 through a washer 24.

The metering chamber 12 is radially delimited by a tubular portion 18, which defines an axial hole 29, in which the control rod 8 is able to slide axially in a fluid-tight way. The portion 18 and the stem 33 form part of a valve body 28 that is made of a single piece and delimits the metering chamber 12 axially on the opposite side of the control rod 8.

The valve body 28 further comprises an intermediate flange 30, from which the stem 33 extends in cantilever fashion. The flange 30 is set axially resting, in a fluid-tight way, against an internal axial shoulder 27 of the injector body 3 and is axially gripped against the shoulder 27 by a threaded ring-nut 31, which is screwed to a internal thread 32 of the injector body 3.

The stem 33 is delimited externally by a cylindrical lateral surface 34, which guides axial sliding of the sleeve 15. In particular, the sleeve 15 has an internal cylindrical surface 36, coupled to the lateral surface 34 substantially in a fluid-tight way, by means of coupling with appropriate diametral play, for example of less than 4 μm, or else by means of interposition of sealing elements.

The discharge passage 14 comprises an axial section 38 defined by a blind cylindrical hole, made in part in the flange 30 and in part in the stem 33, and at least one radial section 39 that is made in the stem 33 and gives out through the lateral surface 34. In particular, the calibrated hole of the discharge passage 14 is formed by the radial section 39 and is designated by the reference number 42. The calibrated hole of the inlet passage 13 is, instead, designated by the reference number 25.

The radial section 39 gives out into an annular chamber 45, which is made on the lateral surface 34 and is opened/closed by axial sliding of the sleeve 15.

The valve seat of the fuel-metering servo valve 9 is designated by the reference number 47 and is defined by an annular shoulder provided on the valve body 28, in an intermediate position between the chamber 45 and the flange 30. As mentioned above, the sleeve 15 is pushed by the spring 22 into the lowered end-of-travel position, where one end 46 of the sleeve 15 is set bearing upon the valve seat 47 to guarantee fluid tightness. The sleeve 15 is attracted by the electromagnet 10a into the raised end-of-travel position, in which the armature 16 is set bearing upon the surface 19 by means of axial interposition of a lamina 50, which defines the residual gap. In the lowered end-of-travel position, the fuel exerts a substantially zero resultant axial thrust on the sleeve 15 since the pressure in the chamber 45 acts only radially on the surface 34.

FIG. 3 shows that, in the preferred embodiment of the injector 1, the control rod 8 is separate from the open/close needle 7 and comprises one end 51 resting axially on one end 52 of the open/close needle 7. A spring 53 acts on the end 52 via the axial interposition of a bushing 54 and in parallel to the axial thrust exerted by the control rod 8. The bushing 54 is coaxial with the open/close needle 7 and surrounds the end 51 of the control rod 8. The end 52 forms part of a cylindrical portion 60, which is guided axially by a cylindrical seat 61 of the nebulizer 5 and has a diameter D1. The open/close needle 7 comprises an intermediate cylindrical portion 64, which has a diameter D2 smaller than the diameter D1 and is housed in an internal cavity 65 of the nebulizer 5, where fuel arrives from the inlet 4 in a way not illustrated. The tip of the open/close needle 7 is designated by the reference number 67 and, in the closing position, engages the sealing seat of the conical tip 6 along a sealing diameter D3 smaller than the diameter D2 so as to block the flow of fuel towards the injection nozzles 6a.

From the constructional and functional standpoint, the injector 1 has the following parameters:
the ratio between the diameter D3 and the diameter D1 is between 0.4 and 0.6;
the ratio between the external diameter D4 of the top end of the control rod 8 (FIG. 2) and the diameter D1 is between 1.07 and 1.1;
the mass of the ensemble of the sleeve 15 and the armature 16 is between 2 and 4 g;
the ratio between the diameters of the calibrated holes 25 and 42 is between 0.9 and 1.1;
the pressure of supply of the fuel into the common rail is between 1400 and 2000 bar.

Figure 4:
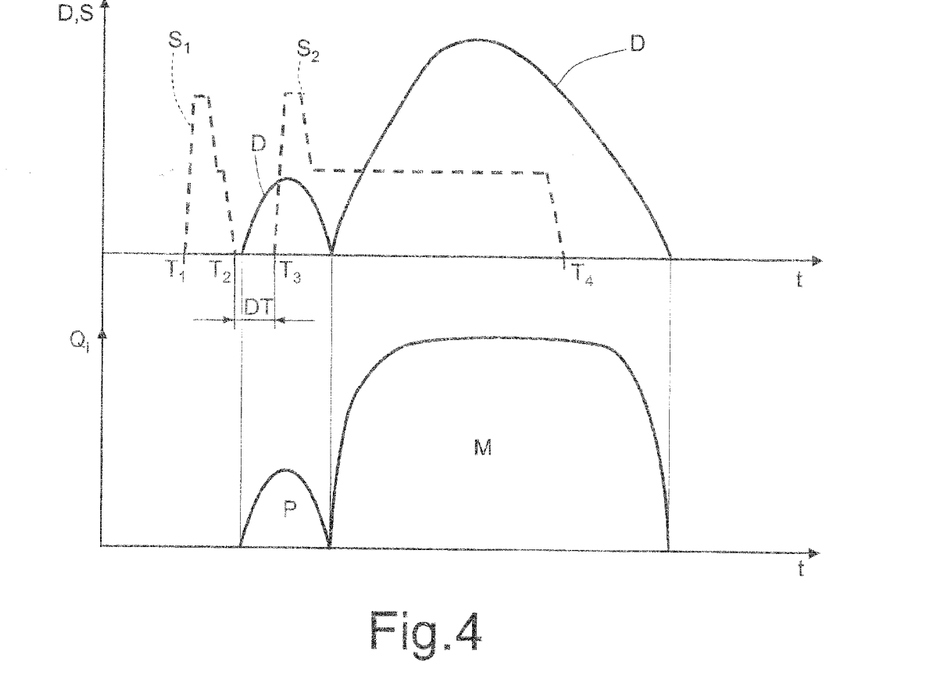
FIGS. 4, 5, and 6 show graphs of operation of the injector of FIGS. 2 and 3.

With reference to FIG. 4, the electronic control unit 11 is programmed for governing the electric actuator 10 in such a way as to implement a strategy of fuel-injection-rate shaping such that the injector 1 will carry out, in one cylinder of the engine and in one engine cycle, an injection event comprising a first fuel injection, in what follows referred to as "pilot injection", and a second fuel-injection, in what follows referred to as "main injection", which starts without solution of continuity with the pilot injection, substantially at the instant in which the pilot injection terminates. In other words, the main injection starts at the instant in which the open/close needle 7 has reached a shut-off position, in which the instantaneous fuel flow rate during the pilot injection has reached a substantially zero value.

In order to provide said fuel-injection-rate shaping, at each event of injection of fuel into a cylinder of the engine, the electronic control unit 11 is programmed to generate at least one first electrical command S1 of predetermined duration for activating the electric actuator 10 and thus actuating the open/close element 15 and getting the control rod 8 to perform a first opening travel, followed by a corresponding first closing travel, for carrying out the pilot injection, and a second electrical command S2 of a duration that is a function of the engine operating conditions for activating the electric actuator 10 and thus actuating the open/close element 15 and getting the control rod 8 to perform a second opening travel, followed by a corresponding second closing travel, for carrying out the main injection. The two electrical commands S1 and S2 are separated in time by an electrical dwell time, designated by DT, such that the main injection will start at the instant in which the instantaneous fuel flow rate of the pilot injection substantially reaches zero.

FIG. 4 shows a top graph, which represents, with a dashed line, as a function of time T, the plot of the first and second electrical commands S1 and S2, for the pilot injection and for the main injection, respectively, issued by the electronic control unit 10, and, with a solid line, the plot of the displacement, designated by D, of the control rod 8, and hence of the open/close needle 7, in response to said electrical commands S1 and S2, with respect to the zero ordinate, where the fuel flow rate through the injection nozzles 6a is substantially zero. Furthermore, FIG. 4 shows a bottom graph, which represents, as a function of time t, the plot of the instantaneous fuel flow rate, designated by Qi, injected into a cylinder of the engine during the pilot and main injections, identified, respectively, by the letters P and M, and corresponding to the displacement D of the control rod 8 and of the open/close needle 7.

As may be noted in the bottom graph of FIG. 4, the pilot and main fuel injections are temporally contiguous, or, from a different standpoint, are separated by a zero hydraulic dwell time. The plot of the instantaneous fuel flow rate Qi is of the two-hump-profile type and enables given benefits in terms of reduction in the fuel consumption and in emissions of pollutant substances.

As may be noted in the top graph of FIG. 4, the first electrical command S1 of the pilot fuel injection is generated and then supplied to the injector 1, starting from an instant designated by T1, and has a plot comprising: a section that rises relatively fast from a minimum value, generally zero, up to a maximum value, having the purpose of energizing the electric actuator 10; a first section of holding of the maximum value, with a very short duration, having the purpose of maintaining excitation of the electric actuator 10; a first section of decrease from the maximum value to an intermediate value between the minimum value and the maximum value; a second section of holding of the intermediate value, having once again the purpose of maintaining excitation of the electric actuator 10; and, finally, a second section of decrease from the intermediate value to the minimum value, which terminates at the instant designated by T2 in FIG. 4. If need be, the second holding section can have zero duration and hence in practice not be present, thus resulting in a first electrical command S1 comprising only a section of rising from the minimum value to the maximum value, a section of holding of the maximum value, and a section of decrease from the maximum value to the minimum value.

The second electrical command S2 is generated and issued to the injector 1 starting from an instant designated by T3 and such that the control rod 8 starts the corresponding second opening travel when the open/close needle 7 has attained a lift between the values h' and h" indicated in the graphs of FIGS. 8a and 8b, which will be described in what follows: in said lift range, the open/close needle 7 substantially blocks the fuel flow rate towards the injection nozzles 6a. In other words, at the end of the first closing travel, the fuel flow rate is substantially zero, or negligible, but in any case the main injection starts without solution of continuity with the pilot injection, because there is no hydraulic dwell time between the pilot and main injections. A displacement without solution of continuity identical to that of the control rod 8 is carried out also by the open/close needle 7 on which the control rod 8 acts.

The time interval T3-T2 defines the aforementioned electrical dwell time DT between the two electrical commands S1 and S2. The second electrical command S2 has a profile very similar to that of the first electrical command S1, with the sole difference that the second section of holding is always present and has a duration much longer than that of the corresponding section of holding, when present, of the first electrical command S1 and varies as a function of the engine operating conditions. The second electrical command S2 terminates at the instant designated by T4 in FIG. 4.

Figure 5:
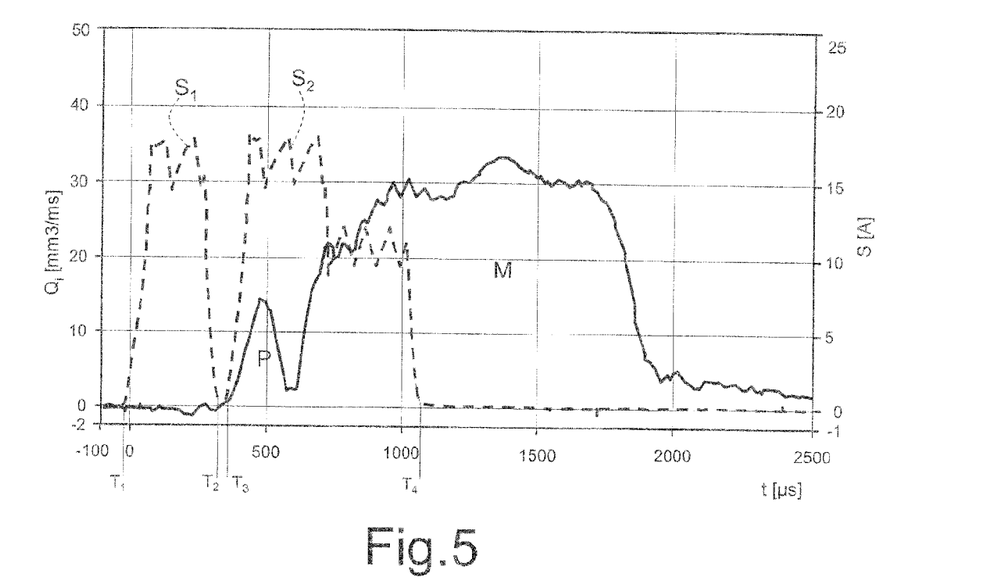

The adverb "substantially" used above in regard to the annulling of the fuel flow rate at the instant in which the pilot injection terminates and the main injection starts includes not only the ideal case, illustrated in FIG. 4, where the instantaneous fuel flow rate at the end of the pilot injection reaches exactly the zero value and the hydraulic dwell time between the end of the pilot injection and the start of the main injection is equal to zero, but also the cases of operation represented by the experimental curves of FIG. 5: in said cases, the instantaneous fuel flow rate at the end of the pilot injection approaches very closely, but does not arrive exactly at, the zero value, so that apparently there is a small overlapping between the pilot and main injections. Said overlapping is due to the fuel flow rate supplied during the stay of the open/close needle 7 at a lift value between the values h' and h" indicated in the graphs of FIGS. 8a and 8b, which will be described in what follows. In fact, the overlapping is only apparent in so far as it does not alter to an appreciable extent from the standpoint of engine parameters the fuel amount injected as a whole during the pilot and main fuel injections with respect to the ideal case illustrated in FIG. 4. In fact, on the one hand, there does not exist any hydraulic dwell time between the main and pilot injections and, on the other hand, the main and pilot injections, albeit contiguous, remain in any case well identified and distinguishable with respect to one another.

In the cases of operation of FIG. 5, the open/close needle 7 does not arrive at blocking instantaneously and perfectly the flow of fuel towards the injection nozzles 6a at the end of the pilot injection because it remains "suspended" in the proximity of the corresponding sealing seat in the nebulizer 5 thanks to a so-called "floating" phenomenon, which will now be described with reference to FIGS. 8a and 8b.

Figure 8A:
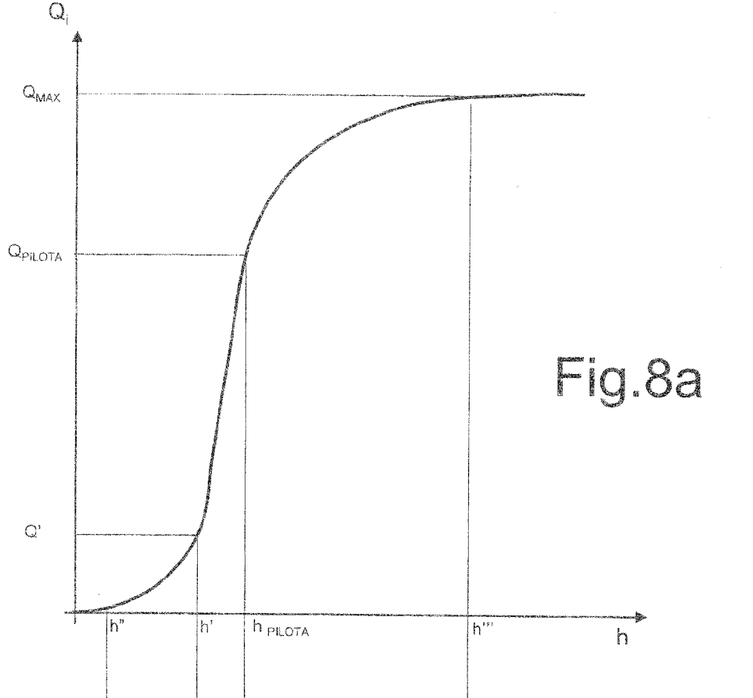
FIG. 8a shows a characteristic curve of the nebulizer of FIG. 3.

FIG. 8a shows, in a qualitative way, a characteristic curve that represents the flow rate Qi of fuel injected by the nebulizer 5 as a function of the lift h of the open/close needle 7 in stationary conditions with fuel supplied to the nebulizer 5 at a given reference pressure, in particular at the pressure in the common rail (for example, 1600 bar). The characteristic curve is obtained by points by fixing various values of the lift h of the open/close needle 7 and then measuring the volume of fuel delivered by the injection nozzles 6a in a given time interval (for example, 30 seconds).

For very small lift values, i.e., h<h", the flow of fuel through the injection nozzles 6a is practically zero. In this case, straddling the restricted section defined between the open/close needle 7 and the corresponding sealing seat in the nebulizer 6, the drop in pressure is extremely high, so that downstream of said restricted section (i.e., in the tip 6b) the fuel has a pressure so low as not to be able to traverse the injection nozzles 6a.

The flow rate increases in a nonlinear way with the lift h as soon as the open/close needle 7 moves away from the sealing seat. In a few hundredths of millimeter of variation in lift, the flow rate increases up to a maximum value $Q_{MAX}$.

Beyond the value h", the characteristic curve may be divided into three sections:
  a first section, from the value h" to the value h', in which the flow rate supplied is negligible, i.e., the flow rate Q' at the value h' is assumed at the most equal to 7% of the maximum value $Q_{MAX}$;
  a second section, from the value h' to the value h''', where there is a considerable increase in the flow rate delivered, up to the maximum value $Q_{MAX}$;
  a third section, with a lift greater than the value h''', where the flow rate delivered is substantially constant and equal to the maximum value $Q_{MAX}$.

The value h" depends upon the supply pressure and upon the type of nebulizer, and is assumed approximately as 30% of the value h'. In general, it is in the region of approximately 4-9 μm.

Figure 8B:
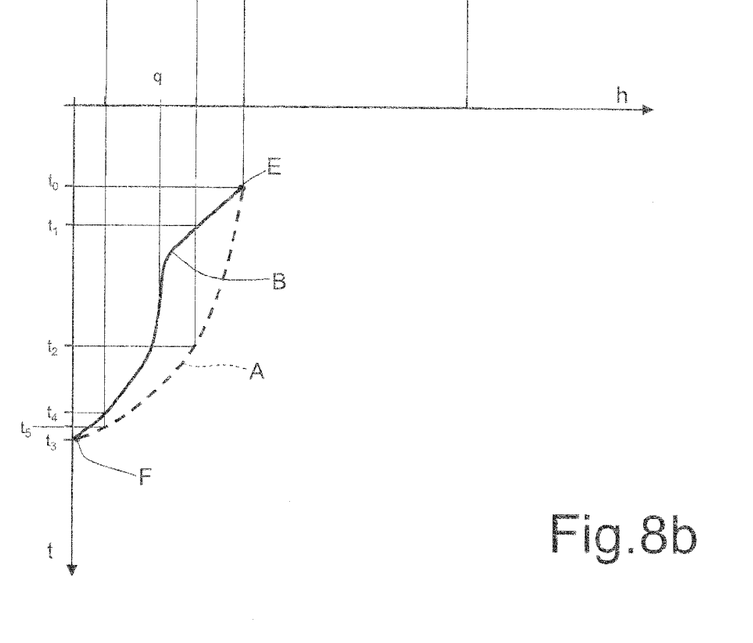
FIG. 8b shows an example of two possible closing laws of a pilot injection for the nebulizer of FIG. 3.

FIG. 8b shows, in a qualitative way, two examples of the motion law of the open/close needle 7 during the first closing travel of the pilot injection: the axis of the abscissae coincides with that of FIG. 8a and represents the distance or lift h of the open/close needle 7 from the corresponding sealing seat on the tip 6, whereas the axis of the ordinates, pointing downwards for convenience, represents the time t.

The descent of the open/close needle 7 starts from a starting point E, where the lift is equal to a value $h_{PILOT}$ (maximum lift reached during the pilot injection) at an instant t0. Assuming that no main injection occurs or that the main injection is separate from the pilot injection, the open/close needle 7 reaches the sealing seat (h=0) at an instant t3 (end point F). Since the volume of fuel introduced during the pilot injection is relatively low (approximately 1-4 mm$^3$), the value $h_{PILOT}$ necessary for delivering this fuel amount is certainly less than the value h'''.

Even if the starting point E and the end point F are kept fixed, the motion law of the open/close needle 7 is extremely variable: in particular, it depends upon the fuel-metering servo valve 9, upon how this is actuated, upon the preload of the spring 53, upon the characteristics of the nebulizer 5, and upon the overall architecture of the injector 1. By way of example, FIG. 8b shows two possible motion laws of the open/close needle 7, designated by the references A and B, during the first closing travel of the pilot injection, as a function of time.

The motion law B envisages:
  a fast displacement of the open/close needle 7 from the value $h_{PILOT}$ to the value h' defined above, where it reaches an instant t1;
  a slow displacement of the open/close needle 7 from the value h' to the value h", where it arrives at an instant t4; in particular, the curve regarding the motion law has an inflection that indicates the aforesaid floating phenomenon.

In the motion law A, instead, the lift reaches the value h' at an instant t2, decidedly higher than the instant t1. In practice, in the case of the motion law A, the time interval for passing from the value h' to the value h" is equal to the difference between the instant t5 and the instant t2 and is very small as compared to the time interval between the instant t4 and the instant t1. In the motion law A, no floating occurs. Obviously, the instants designated by t0, t1, t2, t3, t4, t5 are different from the instants designated by T1, T2, T3, T4.

To obtain a graph of operation like that of FIG. 5, the second electrical command S2 must be given at an instant T3 such as to have a negligible fuel flow rate, i.e., of less than the value Q', at the start of the main injection. Consequently, the main injection must start in the time interval {t1,t4} in the case of the motion law B, or else in the time interval {t2,t5} in the case of the motion law A.

In said conditions, in fact, the re-opening of the open/close needle 7 for the pilot injection does not give rise either to a discontinuity or to overlapping with the pilot injection. In fact, on the one hand, if the second electrical command S2 were synchronized in advance, i.e., so as to cause the main injection to start when the lift of the open/close needle 7 is greater than the value h', the fuel flow rate delivered at the end of the pilot injection would not be negligible and hence there would be an (undesirable) overlapping between the main injection and the pilot injection.

On the other hand, if the second electrical command S2 were given so as to start the main injection when the lift of the open/close needle 7 has dropped below the value h", the main injection would be detached from the preceding pilot injection, and consequently a profile without solution of continuity would not be obtained. In particular, the fuel flow rate through the injection nozzles 6a would be zero both during the descent section of the open/close needle 7 from the lift value h" to the sealing seat and during the subsequent rise to the lift value h".

However, starting the main injection when the lift of the open/close needle 7 is between the values h' and h" is not a condition sufficient to provide with a good repeatability a fuel-injection-rate shaping with two-hump profile. For example, with an injector 1 configured or designed so as to bestow upon its own open/close needle 7 the motion law A, the desired repeatability is not achieved in so far as the chances of synchronizing the second electrical command S2 so as to start the main injection in the short time interval {t2,t5} are low.

With the motion law B, instead, it is possible to provide pilot and main injections without solution of continuity in a repeatable way. In fact, in this case, there is a high likelihood of managing to synchronize the second electrical command S2 so as to start the main injection in the time interval {t1,t4}. In fact, the time interval {t1,t4} is decidedly wider than the time interval {t2,t5}.

As mentioned above, the inflection of the motion law B indicates that the open/close needle 7 "remains" for a certain time interval in the proximity of a height or lift value q in the range between the values h' and h": in practice, it is as if the open/close needle 7, during the first closing travel of the pilot injection, were to stop, almost as if it were "floating" at the lift value q, i.e., a little before reaching the sealing seat. Given the slight uncertainty in determining and/or setting the motion law for the open/close needle 7, the lift value q of the inflection is not defined in a unique way, but it is sufficient for it to be included in the range {h",h'}.

The floating phenomenon is favorable for operation of the injector, in so far as it keeps, for a limited, but not infinitesimal, duration (for example, approximately 15-20 microseconds), the position of the open/close needle 7 around the lift value q. As mentioned above, choosing the electrical dwell time DT so as to start the main injection when the lift h of the open/close needle 7 is between the values h' and h", and preferably when it is approximately equal to the lift value q, this condition approximates the ideal operating point of FIG. 4 and enables a good repeatability of operation to be achieved.

In particular, the lift of the open/close needle 7 for the main injection occurs substantially in the same starting conditions so that the motion law of the open/close needle 7 during the main injection, and hence the fuel amount injected by the injector 1, repeat in a constant way, with good approximation for subsequent injection events in one and the same injector, and also for a given lot of injectors. What is more, the profiles of the instantaneous flow rate of the pilot and main injections are contiguous but distinguishable.

In other words, persistence of the phenomenon of floating of the open/close needle 7 at the lift value q at the end of the pilot injection, for example for a time longer than approximately 15 microseconds, is favorable for the robustness of the fuel-injection system in so far as it ensures a certain margin of time, equal to the difference (t4-t1), in which to synchronize the second electrical command S2 and give rise to the main injection without having as consequence significant changes in the profile of the instantaneous fuel flow rate injected and hence without having a significant variation in the fuel amount as a whole injected by the ensemble of the pilot and main injections. Consider, by way of example, the presence of a small drift or variation in the curve that represents the instantaneous fuel flow rate of the pilot injection as a function of time on account of slight dimensional differences due to wear or ageing in one and the same injector, or else due to machining tolerances for different injectors of one and the same lot: thanks to the aforesaid margin of time, there is a high probability of the main injection starting in any case when the lift of the open/close needle 7 is even less than the value h' and greater than the value h", i.e., in operating conditions similar to those envisaged according to the design specifications with negligible fuel flow rate injected. What is more, in view of the stay of the open/close needle 7 for a few microseconds at the lift value q, there exists also a certain probability of the main injection starting when the open/close needle 7 is once again substantially at the lift value q (i.e., in a floating condition). Consequently, the profile of the instantaneous fuel flow rate as a function of time for the main injection remains substantially unvaried, and hence the fuel amount as a whole injected during the ensemble of the pilot and main injections remains substantially constant.

To obtain the aforesaid floating phenomenon, it is expedient to limit or slow down the increase of the pressure of fuel in the metering chamber 12 at the instants in which the fuel-metering servo valve 9 closes and stops the pilot injection: in fact, the pressure in the metering chamber 12 significantly affects the motion law of the open/close needle 7.

At said instants, the aim is to balance for a certain time interval, together with the force exerted by the spring 53, the opening axial force exerted by the fuel pressure on the open/close needle 7 in the nebulizer 5. Said force acts on the annulus defined by the diameters D1 and D3 (FIG. 3). The value of pressure in the metering chamber 12 that enables floating of the open/close needle 7 hence depends upon the diameters D1, D4, D3 and upon the force of the spring 53, and hence varies according to the sizing of the injector. Generally, said pressure value assumes a value between 50% and 80% of the value of the pressure in the metering chamber 12 when the first electrical command S1 (that is substantially equal to the supply pressure in the common rail) was issued.

Generally, once the supply pressure in the common rail is established, the dynamics with which the pressure varies in the metering chamber 12 depends not only upon the calibrated holes 25 and 42, but also upon the volume of the metering chamber 12, the dynamics with which the open/close element 15 closes (decreasing portion of the curve L of FIG. 6) and then rebounds, the area of passage between the open/close element 15 and the valve seat 47, and the motion law itself of the open/close needle 7 (since the latter, descending, varies the volume of the metering chamber 12).

Experimentally, the present applicant has verified that a significant deceleration of the increase of the pressure in the metering chamber 12 occurs when the open/close element 15 impacts and rebounds on the valve seat 47 at its lowered end-of-travel position in so far as the rebounds tend to re-open the discharge passage 14 of the fuel-metering servo valve 9.

The floating phenomenon depends also upon the amount of the first rebound of the open/close element 15: a big rebound, perhaps in the region of 80% of the maximum travel of the open/close element 15, might not entail a floating of the open/close needle 15, also as a function of the area of passage for the fuel between the open/close element 15 and the valve seat 47, in so far as the fuel coming out of the metering chamber 12 would be excessive.

In this connection, to obtain a significant stay time (for example at least 20 microseconds) of the open/close needle 7 at the lift value q, after the end of the first electrical command S1 (instant T2) it is necessary for the ratio between the volume of fuel that has left and the volume of fuel that has entered the metering chamber 12 to remain between 0.75 and 1 considering a time interval of at least 20 microseconds. In general, the floating phenomenon persists then throughout the time in which said ratio remains above 0.75.

Figure 6:
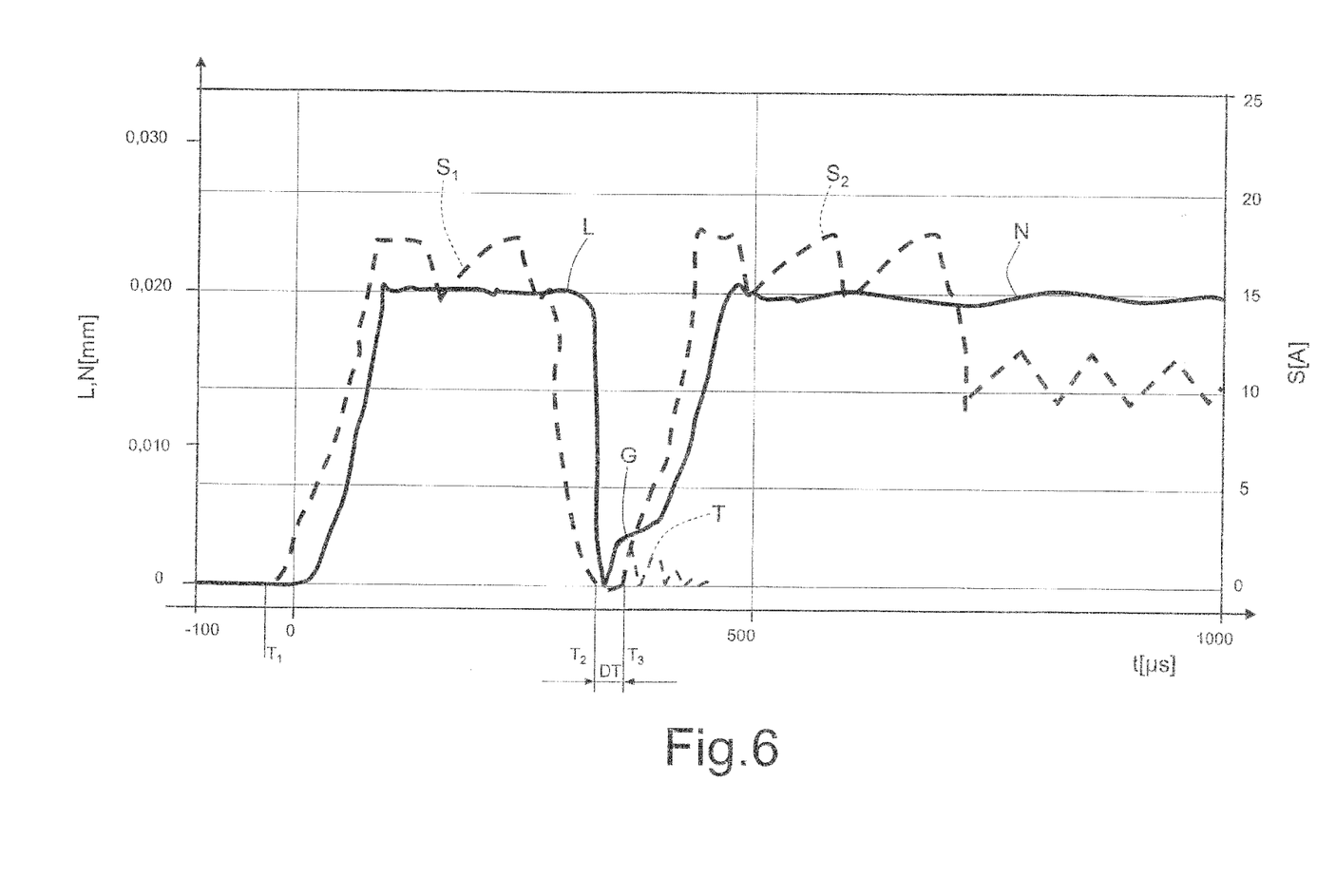

The graph of FIG. 6 shows, as a function of time, the electrical command S1, the displacement L of the open/close element 15 caused by the electrical command S1 to obtain the pilot injection, the electrical command S2 (partially illustrated), and the displacement N (partially illustrated) of the open/close element 15 caused by the electrical command S2 to obtain the main injection. Once the first electrical command S1 has ceased, the open/close element 15 is pushed by the spring 22 of the electric actuator 10 towards its lowered end-of-travel position to close the fuel-metering servo valve 9. The open/close element 15, at the instant in which it encounters the valve seat 47, impacts against the valve body 28 and reverses its direction of motion. The spring 22 of the electric actuator 10 continues to push the open/close element 15 towards the lowered end-of-travel position so that a train of rebounds T is generated, of decreasing amplitude (FIG. 6 shows with a dashed line the train of rebounds T that would occur if there were not the subsequent main injection).

To carry out the main injection, the electrical dwell time DT is chosen (i.e., the second electrical command S2 is synchronized with respect to the first electrical command S1) so as to recall the open/close element 15 towards the raised end-of-travel position when the open/close element 15 rebounds on the valve seat 47 after having terminated a complete travel from the raised end-of-travel position to the lowered end-of-travel position, once the first electrical command S1 has ceased. In other words, the second electrical command S2 for the main injection is issued whilst the open/close element 15 rebounds and has not yet closed completely the discharge passage 14 so that the pressure in the metering chamber 12 is not restored to the level that it had before the first electrical command S1.

The open/close needle 7 moves with a certain delay with respect to the motion of the open/close element 15 and, when it feels the effects of the rebounds during the descent at the end of the pilot injection, tends to float in the proximity of the sealing seat of the nebulizer 5, at a lift value between the values h' and h".

When the second electrical command S2 is issued, the latter causes, in a practically instantaneous way, a lifting force on the open/close element 15 to obtain a complete re-opening of the fuel-metering servo valve 9. Said re-opening, with a certain delay, causes the rise of the open/close needle 7 and hence start of the main injection, precisely when the open/close needle 7 remains at the aforesaid lift value in the floating step.

By introducing a volume of fuel of 1-3 mm$^3$ during the pilot injection, with a supply pressure of approximately 1600 bar, the second electrical command S2 is issued during the first rebounds of the open/close element 15. The electrical dwell time DT depends upon the architecture of the fuel-metering servo valve 9, the preload of the spring 53, the volume of the metering chamber 12, the extent of the rebounds, etc. (consequently it varies from injector to injector).

The electrical dwell time DT must in any case be longer than the time necessary for the open/close element 15 to perform the descent from the raised end-of-travel position to the lowered end-of-travel position. During said descent, the pressure in the metering chamber 12 is partially restored in so far as the fuel flow rate being discharged from the metering chamber 12 is partially blocked by the open/close element 15 already before the latter comes to bear upon the valve seat 47 (i.e., in the final part of the first travel of descent). This lower limit is approximately 20 microseconds and depends upon a wide range of parameters (volume of the metering chamber 12, area of passage between the open/close element 15 and the valve seat 47, etc.).

As mentioned above, the second electrical command S2 is issued during the first rebounds of the train of rebounds T, for example the first two rebounds, and not during the final rebounds, where the opening of the discharge passage 14 can be negligible and hence no longer effective for maintaining the pressure in the metering chamber 12 at a value such as to enable floating of the open/close needle 7.

Furthermore, conveniently, the second electrical command S2 is issued when the open/close element 15 executes a movement in the direction of its raised end-of-travel position, for example substantially at the apex G of its path of motion during the rebound. In this way, the force on the armature 16 is not countered by an acceleration of drop of the open/close element 15 towards the valve seat 47, but is concordant with the direction of the motion of the open/close element 15 so that the times of response of the open/close element 15 to return into the raised end-of-travel position are shorter.

The area of passage uncovered by the open/close element 15 at the apex G of the first rebound is at least five times the section of passage of the hole 42.

The height, the damping, and the number of the rebounds of the open/close element 15 depend upon numerous factors and quantities, such as for example the mass of the open/close element 15 and of the armature 16, the type of coupling (fixed or with axial play) between the armature 16 and the open/close element 15, the state of the fuel (liquid or vapor) at the valve seat 47 during closing of the open/close element 15, the preload and stiffness of the spring 22 of the electric actuator 10, the rise of the open/close element 15 (i.e., the distance between its raised and lowered end-of-travel positions), the area of outflow of fuel, between the open/close element 15 and the valve seat 47 and/or in the calibrated holes 42.

From the foregoing it is evident how the parameters that affect the amplitude of the time interval in which the open/close needle 7 is in a floating condition are numerous, and it is not possible to define exactly optimal values since the possible combinations are extremely numerous.

By way of example, an injector with servo valve having a balanced open/close element like that of FIGS. 2 and 3 is sized in the following way:

the injector 1 is without anti-rebound devices;

the lift of the ensemble of the armature 16 and of the open/close element 15, which are fixed to one another, is between 15 and 23 µm;

the volume of the metering chamber 12 (when the open/close needle 7 bears upon the sealing seat in the nebulizer 5) is between 10 and 20 mm$^3$;

the preload of the spring 22 is between 40 and 75 N;

the sealing diameter between the open/close element 15 and the valve seat 47 is between 2.3 and 2.8 mm;

the preload of the spring 53 is between 20 and 35 N;

the equivalent diameter of the calibrated holes 42 is between 0.2 and 0.25 mm;

the ratio between the diameter D3 and the diameter D1 is between 0.4 and 0.6;

the ratio between the external diameter D4 of the control rod 8 (FIG. 2) and the diameter D1 is between 1.07 and 1.1;

the mass of the ensemble of the sleeve 15 and of the armature 16 is between 2 and 4 g;

the ratio between the diameters of the holes 25 and 42 is between 0.9 and the maximum value $Q_{MAX}$ of the flow rate of the nebulizer is between 270 and 450 cm$^3$/30 s, at a reference pressure of 100 bar; and the travel of the open/close element 15 between the lowered and raised end-of-travel positions is between 12 and 22 µm.

With this sizing it is experimentally found that, with a supply pressure of 1600 bar, the optimal electrical dwell time DT for raising the open/close needle 76 again during its floating at the lift value q is between 25 and 60 microseconds.

From the foregoing it is evident how it is expedient to choose the electrical dwell time DT in order for the pilot and main injections to be without solution of continuity and in order for the second electrical command S2 to be issued when the open/close needle 7 is floating at a distance between the values h' and h".

The setting of the electrical dwell time DT so as to raise the open/close element 15 during the rebounds is a particular preferred case in which the start of the main injection can coincide with the floating of the open/close needle 7.

Floating of the open/close needle 7 enables, not only a good uniformity for the fuel amount injected between successive injection events of the same injector 1 to be obtained, but also a good uniformity of operation between different injectors belonging to one and the same lot, and a good uniformity for the fuel amount injected, notwithstanding wear and ageing.

From the experimental tests conducted, the setting of the volume of the metering chamber 12 and of the other parameters referred to above prove to be important. Given that it is the fruit of a demanding experimental campaign, such setting is by no means trivial for a person skilled in art willing to determine whether, and by how much, the open/close needle 7 is affected by the floating phenomenon. For example, once all the other parameters have been fixed in the ranges referred to above, if preload of the spring 22 is set at a value higher than 130 N, the rebounds of the open/close element 15 substantially vanish, and the motion law of the open/close needle 7 has not no inflection of stay at a lift value q.

It is clear that modifications and variations may be made to the injector 1 and to the system 2 described and illustrated herein, without thereby departing from the scope of the present invention, as defined in the annexed claims.

For example, the nebulizer can be of a type different from the one illustrated in FIG. 7, for example of a VCO (valve covered orifice) type, where the injection nozzles are directly occluded by the open/close needle 7: the characteristics curves of this type of nebulizers have a plot qualitatively similar to what is illustrated in FIG. 8*a*.

To obtain floating of the open/close needle 7 an open/close element could be used that does not rebound but is driven by a piezoelectric actuator with a motion law such as to assign to the pressure in the metering chamber 12 a profile equivalent to what can be obtained with the rebounds.

The injector 1 could be provided with a device for controlling the rebounds, as described in the European patent application No. EP2138705, filed in the name of the present applicant, and configured so as to limit the amplitude or cause complete vanishing of the rebounds subsequent to the one on which the start of the second command where rise of the open/close element 15 must occur to govern the main injection is synchronized. Said device consequently intervenes for all the pilot injections forming part of injection events not subject to a fuel-injection-rate shaping, and for all the injections that are different from the pilot injections (for example, for the end of all the main injections).

In the treatment set forth above, for reasons of simplicity, there has not been taken into account the axial elastic deformation of the open/close needle 7 (and possibly of the control rod 8, where present) when the open/close needle 7 comes into contact with the sealing seat of the nebulizer 5.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A fuel-injection system for an internal-combustion engine, comprising:
    at least one fuel injector comprising:
        a) a fuel-metering servo valve comprising:
            (1) an electric actuator,
            (2) a metering chamber, and
            (3) an open/close element, which is movable in response to the action of the electric actuator between a lowered end-of-travel position, in which the open/close element rests against a valve seat for closing a discharge passage coming out of said metering chamber, and a raised end-of-travel position, in which the open/close element leaves said discharge passage open; and
        b) an open/close needle, movable in response to the elastic action of a positioning spring and to the pressure in said metering chamber for carrying out fuel injections into a cylinder of the internal-combustion engine; and
    an electronic control unit configured to issue, to said electric actuator, a first electrical command, for causing said open/close needle to perform a first opening travel for carrying out a pilot fuel injection, and a second electrical command for causing said open/close needle to perform a second opening travel for carrying out a main fuel injection in a fuel injection event into said cylinder, the first and second electrical commands being separated in time by an electrical dwell time such that the main fuel injection starts without hydraulic dwell time with respect to the end of the pilot fuel injection;
    wherein sizing of the injector and movement of said open/close element for closing said discharge passage are such that the pressure in said metering chamber balances, for a certain time interval, together with the force exerted by said positioning spring, the opening axial force exerted by the fuel pressure on said open/close needle at the end of the pilot fuel injection in such a way that, if no subsequent main injection were commanded, the curve that represents the lift of said open/close needle (7) as a function of time along the closing travel of the pilot fuel injection has an inflection point at a third lift value between a first lift value and a second lift value to enable a temporary stay of the open/close needle substantially at said third lift value;

wherein considering a characteristic curve that represents the fuel flow rate injected as a function of the lift of the open/close needle at a given reference pressure, said first lift value is assumed equal to a lift value that enables a fuel flow rate of 7% of a value of maximum flow rate to be obtained and said second lift value is assumed as 30% of said first lift value; and wherein said second electrical command is issued to said electric actuator so as to start the second opening travel of said open/close needle when said open/close needle is between said first and second lift values.

2. The system according to claim 1, wherein closing of said discharge passage is carried out by allowing at least one rebound of said open/close element after an impact on said valve seat, before issuing said second electrical command.

3. The system according to claim 1, wherein said electric actuator is piezoelectric, and the closing of said discharge passage is carried out by controlling said piezoelectric actuator.

4. The system according to claim 1, wherein, at the start of the life of said injector, said second electrical command is issued to said electric actuator so as to start the main fuel injection when said open/close needle is substantially at said third lift value.

5. The system according to claim 1, wherein the injector is configured in such a way that said open/close needle remains substantially at said third lift value for a time longer than 15 microseconds.

6. The system according to claim 1, wherein said reference pressure of said characteristic curve is equal to the supply pressure in the common rail.

7. The system according to claim 1, wherein said second electrical command is issued to said electric actuator when the fuel pressure in said metering chamber is between 50% and 80% of the pressure in said metering chamber when said first electrical command is issued.

8. The system according to claim 1, wherein said injector is configured in such a way that the ratio between the volume of fuel leaving and the volume of fuel entering said metering chamber remains between 0.75 and 1 considering a time interval of at least 20 microseconds after the end of the first electrical command.

9. The system according to claim 2, wherein said second electrical command is issued to said electric actuator during said rebound.

10. The system according to claim 9, wherein said second electrical command is issued during a rebound between the first two impacts of said open/close element on said valve seat.

11. The system according to claim 9, wherein said second electrical command is issued when said open/close element makes a movement directed towards its raised end-of-travel position.

12. The system according to claim 11, wherein said second electrical command is issued substantially when said open/close element is at the apex of said rebound.

13. The system according to claim 9, wherein said injector is without anti-rebound devices.

14. The system according to claim 9, wherein said injector comprises a control device that limits the amplitude or annuls the rebounds subsequent to the one on which the start of said second electrical command is synchronized.

15. The system according to claim 1, wherein said open/close element is defined by a sleeve, on which the fuel pressure exerts opening forces substantially zero when said open/close element is set in the lowered end-of-travel position.

16. The system according to claim 13, wherein:
said open/close element is defined by a sleeve, on which the fuel pressure exerts opening forces substantially zero when said open/close element is set in the lowered end-of-travel position;
said fuel-metering servo valve has two restrictions, which are set, respectively, in an inlet passage that gives out into the metering chamber and in said discharge passage;
the ratio between the diameter in which said open/close needle provides a seal to block the fuel-injection and the maximum diameter of said open/close needle is between 0.4 and 0.6;
the ratio between the diameters of said restrictions is between 0.9 and 1.1;
the volume of said metering chamber when said open/close needle provides a seal against the corresponding sealing seat is between 10 and 20 mm$^3$;
the sealing diameter between said open/close element and said valve seat is between 2.3 and 2.8 mm; and
the travel of said open/close element between said lowered and raised end-of-travel positions is between 12 and 22 µm;
and wherein the electrical dwell time between the end of the first electrical command and the start of the second electrical command is between 25 and 60 microseconds.

* * * * *